(12) United States Patent
Hirunuma et al.

(10) Patent No.: US 6,717,754 B2
(45) Date of Patent: Apr. 6, 2004

(54) LENS-HOLDING FRAME

(75) Inventors: Ken Hirunuma, Tokyo (JP); Gouji Funatsu, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/347,918

(22) Filed: Jan. 22, 2003

(65) Prior Publication Data

US 2003/0142418 A1 Jul. 31, 2003

(30) Foreign Application Priority Data

Jan. 28, 2002 (JP) ..................... P2002-018456

(51) Int. Cl.[7] ................................ G02B 7/02
(52) U.S. Cl. ................................. 359/819
(58) Field of Search ................. 359/694, 703, 359/704, 819, 820

(56) References Cited

U.S. PATENT DOCUMENTS

| | | | |
|---|---|---|---|
| 4,778,252 A | 10/1988 | Filho | |
| 4,929,054 A | * 5/1990 | Ahmad et al. | 359/820 |
| 5,053,794 A | * 10/1991 | Benz | 396/432 |
| 5,249,082 A | * 9/1993 | Newman | 359/813 |
| 5,488,514 A | * 1/1996 | Bruning et al. | 359/811 |
| 5,828,482 A | 10/1998 | Jain | |
| 6,130,788 A | 10/2000 | Nomura et al. | |
| 6,411,448 B2 | * 6/2002 | Takanashi et al. | 359/822 |

FOREIGN PATENT DOCUMENTS

GB 0621875 7/1946

* cited by examiner

*Primary Examiner*—Ricky Mack
(74) *Attorney, Agent, or Firm*—Greenblum & Bernstein, P.L.C.

(57) ABSTRACT

A lens-holding frame comprises a frame body and a plurality of elastically deformable lens-holding arms. The arms are supported in a cantilever manner by the frame body and they circumscribe a circle having the same diameter as the lens. A positioning member is provided on the frame body along the circumference of the circle so that the positioning member abuts against the circumferential edge of the lens to define the lens holding position. Each arm is provided with a projection that penetrates inside the circle. The projection has a tapered surface, so that when the circumferential edge of the lens is engaged with the projections and the lens is pushed in toward the positioning member, the arms are elastically pushed open and the circumferential edge of the lens rides over the projections, whereby the lens is held.

11 Claims, 8 Drawing Sheets

LENS-HOLDING FRAME

BACKGROUND OF THE INVENTION

1. Field of the Invention

The present invention relates to a lens-holding frame for holding a lens group that comprises at least one lens element at a predetermined position.

2. Description of the Related Art

For general configuration of a widely known lens-holding frame, a lens holding barrel having an inside diameter substantially equal to the diameter of a lens held in the barrel, is used as the lens-holding frame body. On the inner surface of the lens holding barrel and on a side close to one end thereof, a ring-shaped rim is formed that extends inwardly to the radial direction from the inner surface along its circumference. A ring-shaped plane of the ring-shaped rim functions as a lens-abutting end-face. Namely, when a lens is inserted inside the lens holding barrel from the opening at the other end of the lens holding barrel, the circumference of the lens abuts against the lens-abutting end-face of the ring-shaped rim. Due to this, the position of the lens inside the lens holding barrel is defined.

On the other hand, a female thread is formed or cut on the inner surface of the lens holding barrel into which a lens-retaining ring is screwed. Thereby, the lens group is held at a predetermined position inside the lens holding barrel by screwing the lens-retaining ring into the lens holding barrel under condition that the leading lens of the lens group inserted inside the lens holding barrel abuts against the lens-abutting end-face.

SUMMARY OF THE INVENTION

An object of the present invention is to provide a lens-holding frame comprised of a single piece that can be produced at a relatively low cost and has an advantage in lens mounting efficiency.

According to the present invention, a lens-holding frame for holding a lens at a predetermined position is provided that comprises a frame body, at least two lens-holding arms, and a positioning member.

Each of the lens-holding arms is elastically deformable and supported in a cantilever manner by the frame body, so that the lens-holding arms circumscribe the lens. The positioning member is provided along the inside circumference of the frame body so that the positioning member abuts against a circumferential edge of the lens and defines the holding position of the lens. Each of the lens-holding arms comprises a projection which projects out and penetrates to the inside of the frame body, and a space between the positioning member and the projection is given dimensions and a shape that can receive the circumferential edge of the lens. Further the projection is formed with a tapered surface, so that the circumferential edge of the lens can ride over the projection as a result of the lens-holding arms being elastically pushed open when the circumferential edge of the lens is engaged with the tapered surface and the lens is pushed in toward the positioning member.

The frame body may comprise a connection part which is used for connecting the frame body to a lens barrel, so that the lens-holding frame can be applied to various type of optical systems. When the lens-holding frame is applied to a specific optical system, the frame body may be integrally formed as part of a lens barrel.

To facilitate the processing or optical accuracy of the lens, the lens preferably describes a circular profile. At this time, the lens-holding arms are made to circumscribe a circle having substantially the same diameter as the lens, so that the projections of the lens-holding arms are made to penetrate inside the circle.

Preferably, each of said lens-holding arms comprises a first arm section that extends in parallel with a center axis of the frame body and a second arm section that integrally extends from the first arm section along an arc of said circle. Further, the projection is integrally formed at the front end of the second arm section. Thereby, the total length along the first and second arm sections becomes relatively long even when the first and second arm sections are arranged in a narrow region, so that each lens-holding arm can bear suitable elasticity.

For molding the sleeve-shaped member integrally, the frame body may be configured as a sleeve-shaped member that comprises a synthetic resin material. Further, the inside diameter of the sleeve-shaped member is substantially equal to the diameter of the lens, and the lens-holding arms are integrally formed in the circumferential wall of the sleeve-shaped member. At this time, the positioning member may comprise a ring-shaped abutting end-face that is formed at a ring-shaped rim which integrally extends out from the inner surface of the sleeve-shaped member along the circumference of the inner surface. In another aspect, the positioning member may comprise arc-shaped abutting end-faces that are formed at each of arc-shaped rims. The arc-shaped abutting end-faces integrally extend out from the inner surface of the sleeve-shaped member along the circumference of the inner surface at equal intervals. These constructions may simplify the structure of the positioning member.

From another aspect of the invention, the frame body may be configured as a ring-shaped disk member. The disk member may be comprised of a synthetic resin material. Further, an outside diameter of the ring-shaped disk member is larger than the diameter of the lens, and the lens-holding arms integrally extend out from one side of the ring-shaped disk member in parallel with the center axis of the ring-shaped disk member. This enables further miniaturelization of the lens-holding frame. In this construction, the positioning member may comprise a ring-shaped abutting end-face that is formed on the one side of the ring-shaped disk member along the circumference of the ring-shaped disk member. Further, the positioning member comprises at least two arc-shaped abutting end-faces that are formed at equal intervals on the above one side of the ring-shaped disk member along the circumference of the ring-shaped disk member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Embodiments of the lens-holding frame according to the present invention will be explained with reference to the attached drawings.

Figure 1:
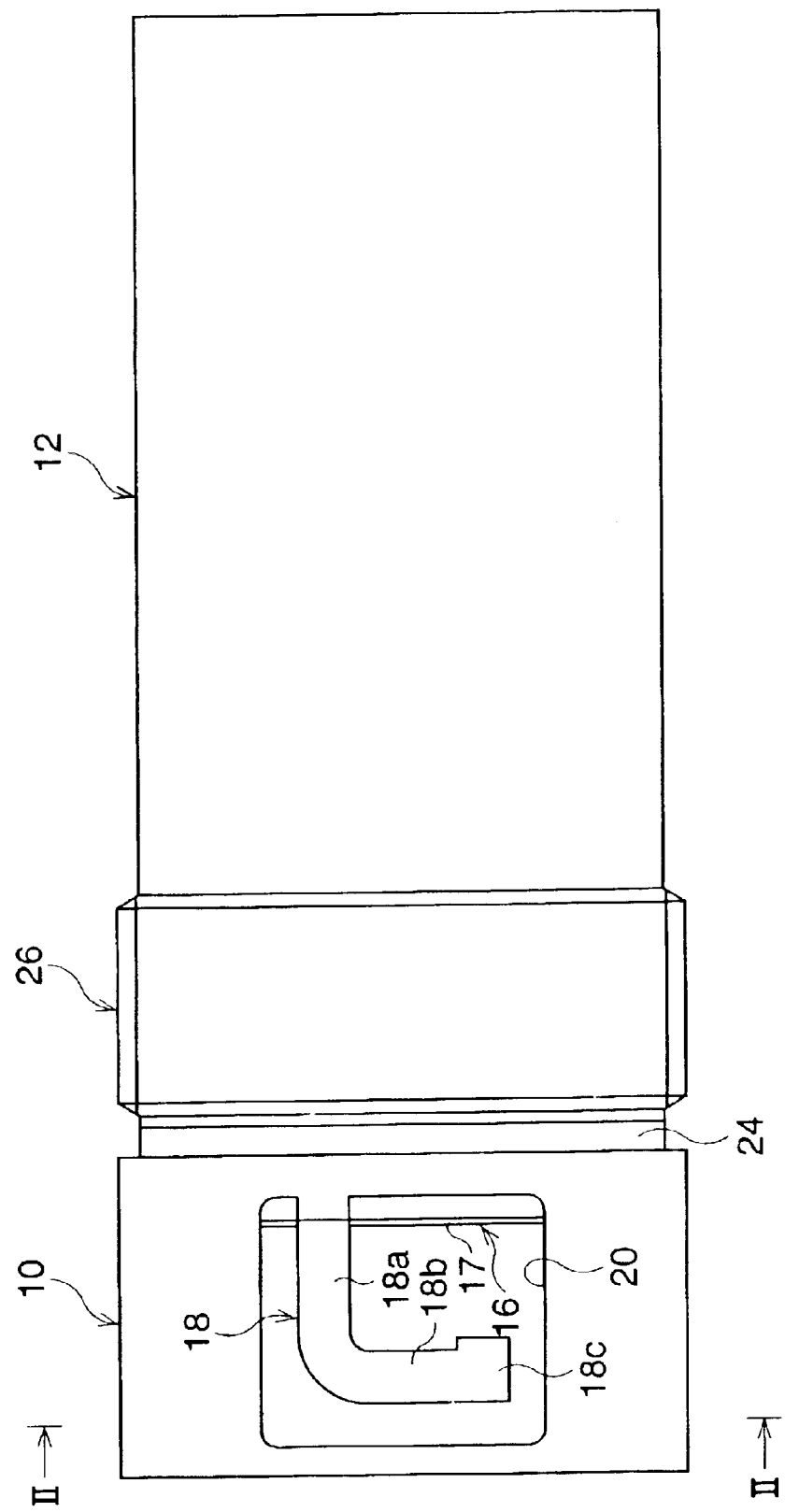
FIG. 1 is a plan view of a first embodiment of a lens-holding frame according to the present invention showing the state of said lens-holding frame connected to a lens barrel.
Figure 2:
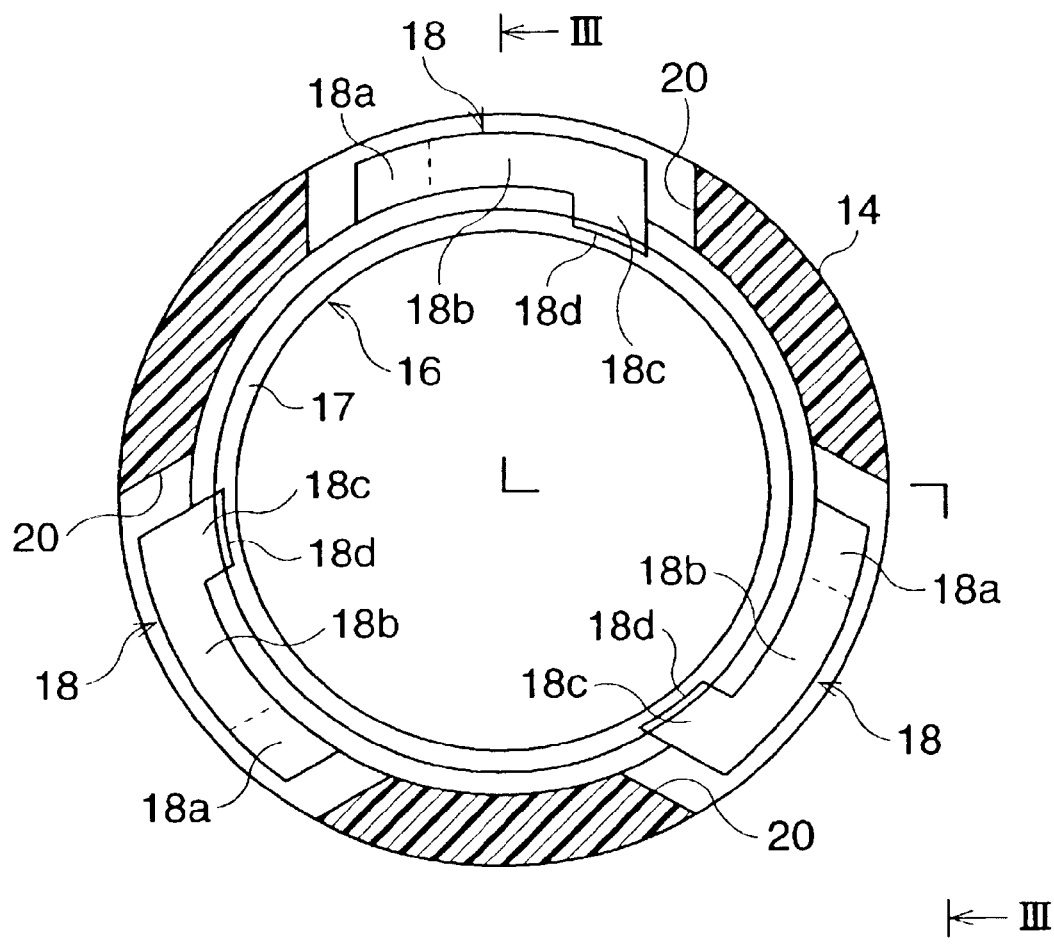
FIG. 2 is a lateral sectional view of a lens-holding frame along line II—II of FIG. 1.
Figure 3:
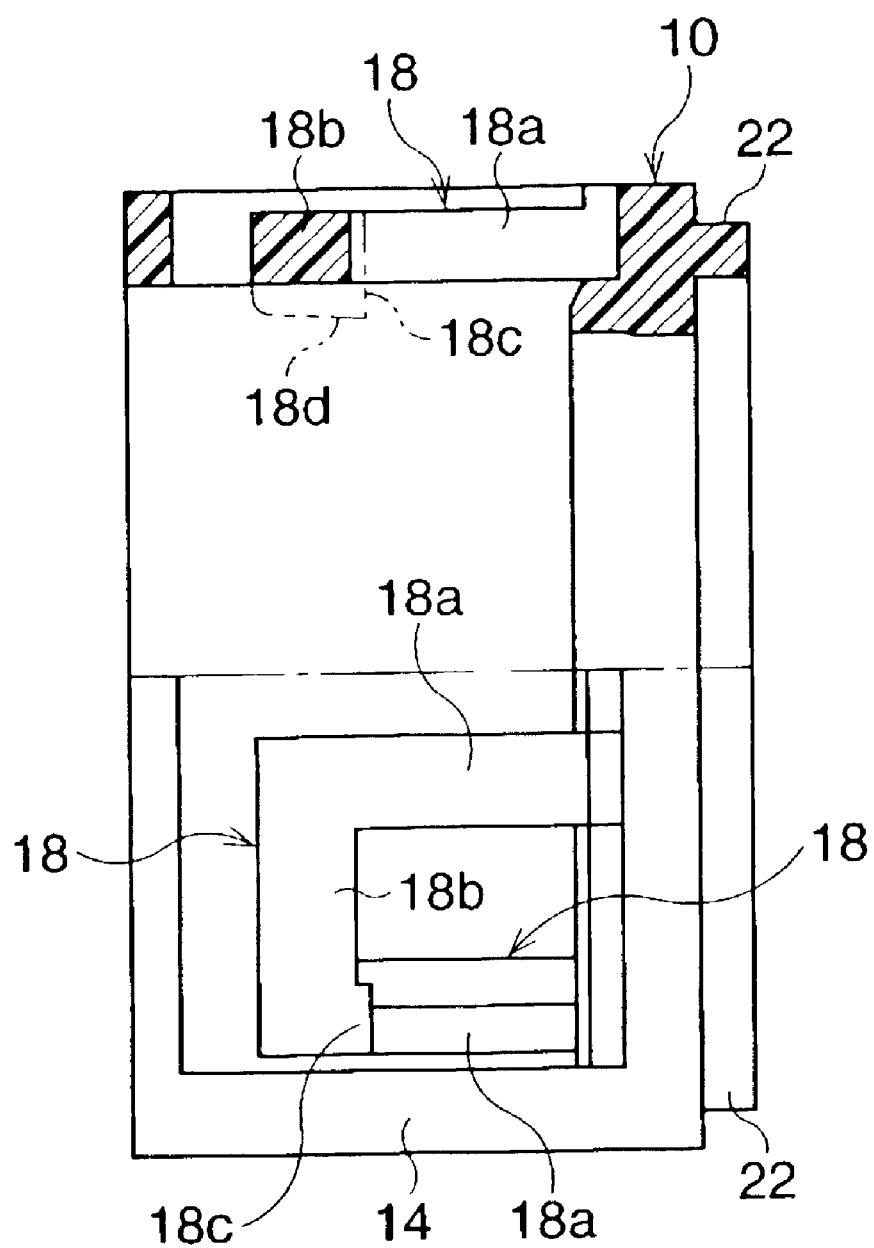
FIG. 3 is a partial longitudinal sectional view of a lens-holding frame along the line III—III of FIG. 2.
Figure 4:
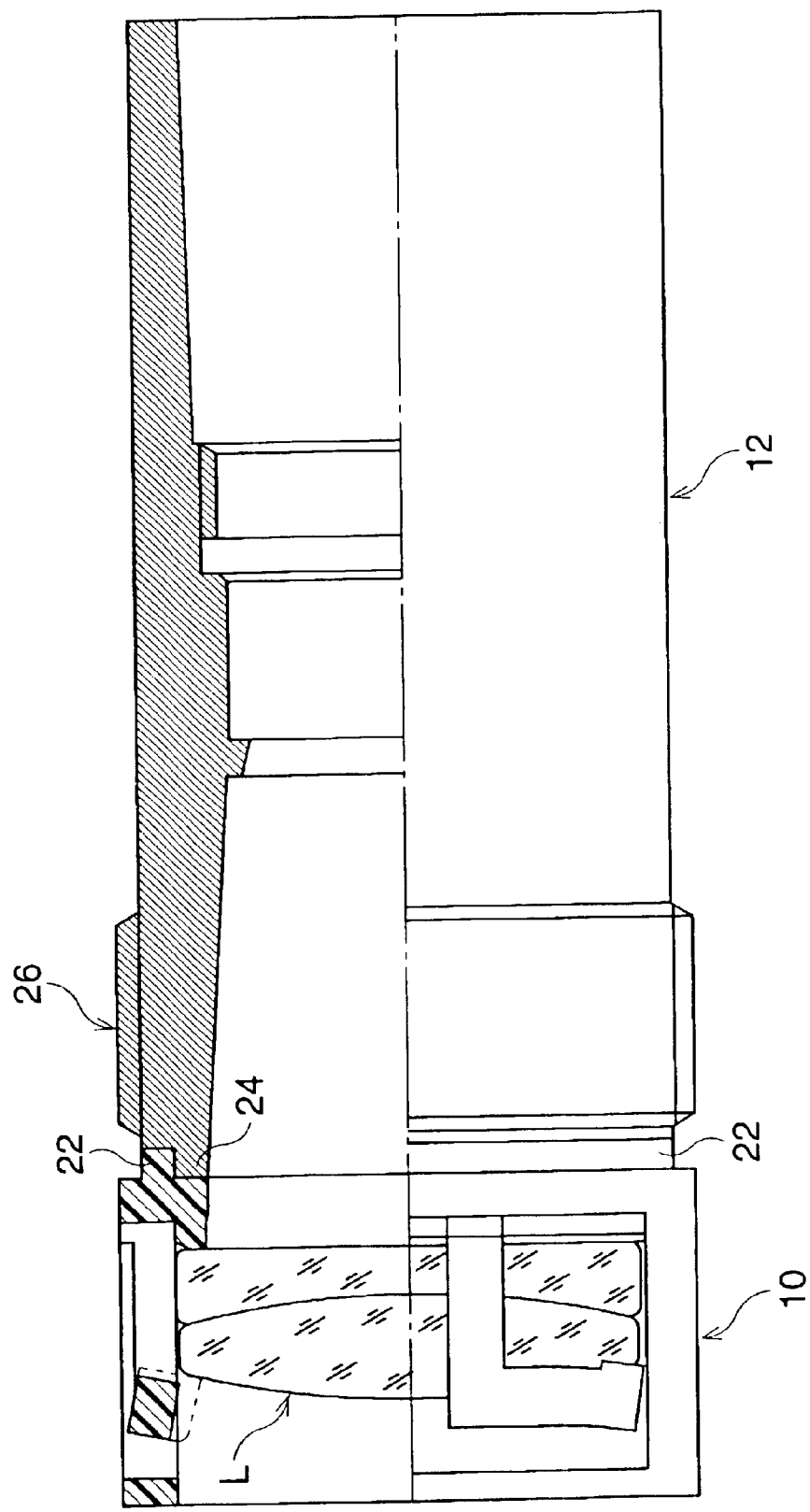
FIG. 4 is a partial longitudinal sectional view similar to FIG. 3 showing the state of an object lens held at the lens-holding frame and further the state of the lens-holding frame connected to the lens barrel.

First, referring to FIG. 1 to FIG. 4, a first embodiment of the lens-holding frame according to the present invention will be shown by reference to the numeral 10. As shown in FIG. 1, in the present embodiment, the lens-holding frame 10 is suitably connected to the lens barrel 12 of a monocular or binocular observation optical system and is used for holding an object lens of the observation optical system. FIG. 2 is a lateral sectional view of the lens-holding frame 10 along the line II—II of FIG. 1. FIG. 3 is a partial longitudinal sectional view of the lens-holding frame 10 along the line III—III of FIG. 2. Further, FIG. 4 is a partial longitudinal sectional view similar to FIG. 3 showing the state of the object lens group L held in the lens-holding frame 10. FIG. 4 also shows the state of the lens-holding frame 10 connected to the lens barrel 12. Note that in FIG. 4, the object lens group L is comprised of a compound lens comprising a convex lens element and a concave lens element, but of course it can be comprised of a single lens.

In the first embodiment, the lens-holding frame 10 is comprised of a ring-shaped frame body 14 formed as a sleeve-shaped member. The ring-shaped frame body or the sleeve-shaped member 14 is formed as a single piece from a suitable synthetic resin material using a predetermined mold. An example of the material is an ABS resin material. The inside diameter of the sleeve-shaped member 14 is substantially equal to the diameter of the lenses in the lens group L. Therefore, the lens group L can be housed in the sleeve-shaped member 14. Note that configuration of the lens or lenses in the lens group L may a rectangular or another shape, not just circular, but a circular lens such as in the present embodiment eases the processing or optical accuracy of the lens.

In the present embodiment, on a side close to one end of the sleeve-shaped member 14, a ring-shaped rim 16 that projects out integrally from the inner surface of the sleeve-shaped member 14 along the circumference thereof is formed. A side plane of the ring-shaped rim 16 functions as a ring-shaped abutting end-face 17 for defining the holding position of the lens group L. Namely, the ring-shaped rim 16 extends along the inside circular circumference of the sleeve-shaped member 14 of which the diameter is substantially equal to the diameter of the lens group L (the diameter of the lens or lenses in the lens group L). When the lens group L is housed in the sleeve-shaped member 14, the circumferential edge of the forefront lens of the lens group L engages with or abuts against the ring-shaped abutting end-face 17 of the ring-shaped rim 16. Due to this, the holding position of the lens group L is defined.

Further, the sleeve-shaped member 14 is formed integrally with three lens-holding arms 18. The lens-holding arms 18 are formed in the circumferential wall of the sleeve-shaped member 14 and these three lens-holding arms 18 are arranged at equal intervals at the circumference of the sleeve-shaped member 14. That is, the sleeve-shaped member 14 is integrally formed by a predetermined mold so that the opening 20 is de facto cut into the circumferential wall and the lens-holding arms 18 are formed there. As explained above, the inside diameter of the sleeve-shaped member 14 is substantially equal to the outside diameter of the lens group L. Therefore, the three lens-holding arms 18 are arranged so as to circumscribe a circle having substantially the same diameter as the lens group L.

As illustrated in the figures, each lens-holding arm 18 is supported in a cantilever manner from the circumferential wall of the sleeve-shaped member 14. In the present embodiment, each lens-holding arm 18 is comprised of a first arm section 18a integrally extending from the circumferential wall of the sleeve-shaped member 14 in a direction parallel to the center axis of the sleeve-shaped member 14 and a second arm section 18b integrally extending from the first arm section 18a along the arc of the above circle. Namely, the second arm section 18b is bent at a right angle with respect to the first arm section 18a. Therefore, despite the fact that the first and second arm sections 18a and 18b are arranged in a relatively narrow region, the total length of the two arm sections 18a and 18b becomes relatively long, so each lens-holding arm 18 can be given suitable elasticity. In short, even when the sleeve-shaped member 14 is formed from a relatively hard synthetic resin material, each lens-holding arm 18 can be given suitable elasticity.

The second arm section 18b of each lens-holding arm 18 is integrally formed with a projection 18c. The projection 18c projects out so as to penetrate to the inside of the above circle. The space between the ring-shaped abutting end-face 17 of the ring-shaped rim 16 and the projection 18c is given dimensions and a shape enabling the circumferential edge of the lens or lenses of the lens group L to be received. Further, the projection 18c is formed with a tapered surface 18d. The three tapered surfaces 18d, as shown in FIG. 2, form part of a conical surface coaxial with the center axis of the sleeve-shaped member 14, and become narrower toward the ring-shaped abutting end-face 17 side. Note that in FIG. 3, a projection 18c and a tapered surface 18d are shown by imaginary lines (two-dot chain lines) at the locations where the second arm section 18b is illustrated by a sectional view.

Therefore, if the lens group L is pushed in toward the ring-shaped abutting end-face 17 side in the state with the circumferential edge of the lens group L engaged with the three tapered surfaces 18d, the three lens-holding arms 18 are elastically pushed open to the outside, in the radial direction, and the circumferential edge of the lens group L can ride over the projections 18c. When the circumferential edge of the lens group L rides over the projections 18c, the circumferential edge of the lens group L at the front side in the pushing direction abuts against the ring-shaped abutting end-face 17. At the circumferential edge at the rear side of the pushing direction, the projections 18c are elastically pressed due to the elastic deformation of the first arm section 18a and second arm section 18b. Therefore, the lens group L, as shown in FIG. 4, is held at a predetermined holding position in the lens-holding frame 10.

The lens barrel 12 is formed from a suitable metal material, for example, aluminum. Part of a monocular or binocular observation optical system is housed in the lens barrel 12. For connecting the lens-holding frame 10 to the lens barrel 12, a ring-shaped connection part 22 is formed at the end-face of the sleeve-shaped member 14, that is, the end-face at the side adjoining the ring-shaped rim 16. On the other hand, a ring-shaped engagement part 24 designed to engage with the ring-shaped connection part 22 is formed on the corresponding end-face of the lens barrel 12. When joining the ring-shaped engagement part 24 to the ring-shaped connection part 22, a suitable adhesive is used. Due to this, the lens-holding frame 10 is fastened to the lens barrel 12. The lens group L may be mounted in the lens-holding frame 10 before or after connecting the lens barrel 12 to the lens-holding frame 10.

Of course, the lens barrel 12 itself can be formed from a suitable synthetic resin material. When the lens barrel 12 is formed from the same synthetic resin material as the lens-holding frame 10, it is possible to form the lens-holding frame 10 integrally together with the lens barrel 12.

Note that in FIG. 1 and FIG. 4, reference numeral 26 indicates a helicoid thread formed at the circumference of the lens barrel 12. This helicoid thread 26 is used for moving the lens barrel 12 for focusing when the lens barrel 12 is assembled in a monocular or binocular optical system.

In the above embodiment, the sleeve-shaped member 14 is provided with three lens-holding arms 18, but it is possible to arrange two lens-holding arms 18 in the diametrical direction. Alternatively, it is possible to arrange more than three lens-holding arms, for example, four lens-holding arms, at equal intervals at 90° angles.

Figure 5:
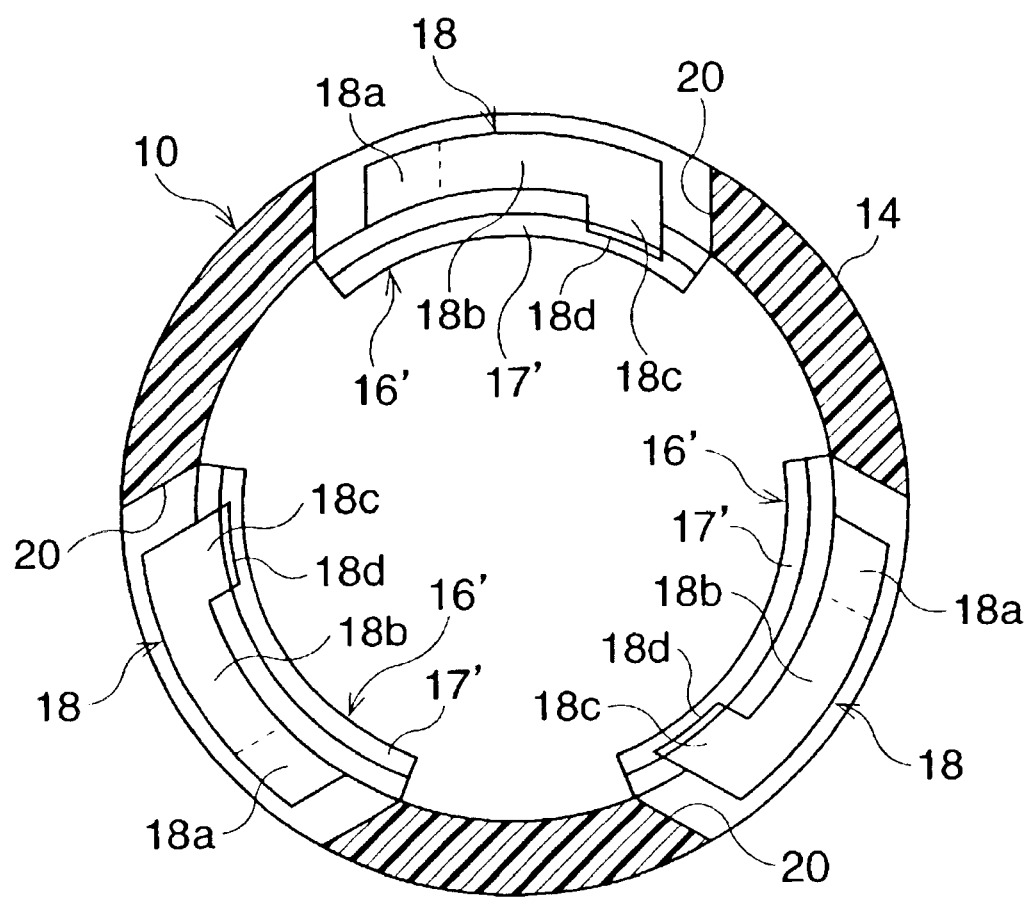
FIG. 5 is a sectional view corresponding to FIG. 2 showing a modified embodiment of the first embodiment of the present invention.

Referring to FIG. 5, a modified version of the above embodiment will be shown. Note that in FIG. 5, the same reference numerals are used for components similar to those of the first embodiment. In the above embodiment, the ring-shaped rim 16 is provided as a positioning member for defining the holding position of the lens group L, by means of abutting the end-face of the rim 16 against the lens. In the modified embodiment shown in FIG. 5, instead of the ring-shaped rim 16, a suitable number, for example, three, arc-shaped rims 16' are provided at 120° angular intervals. The side planes of these three arc-shaped rims 16' function as arc-shaped abutting end-faces 17'. The lens group L is positioned at a predetermined holding position by these arc-shaped abutting end-faces 17'.

Figure 6:
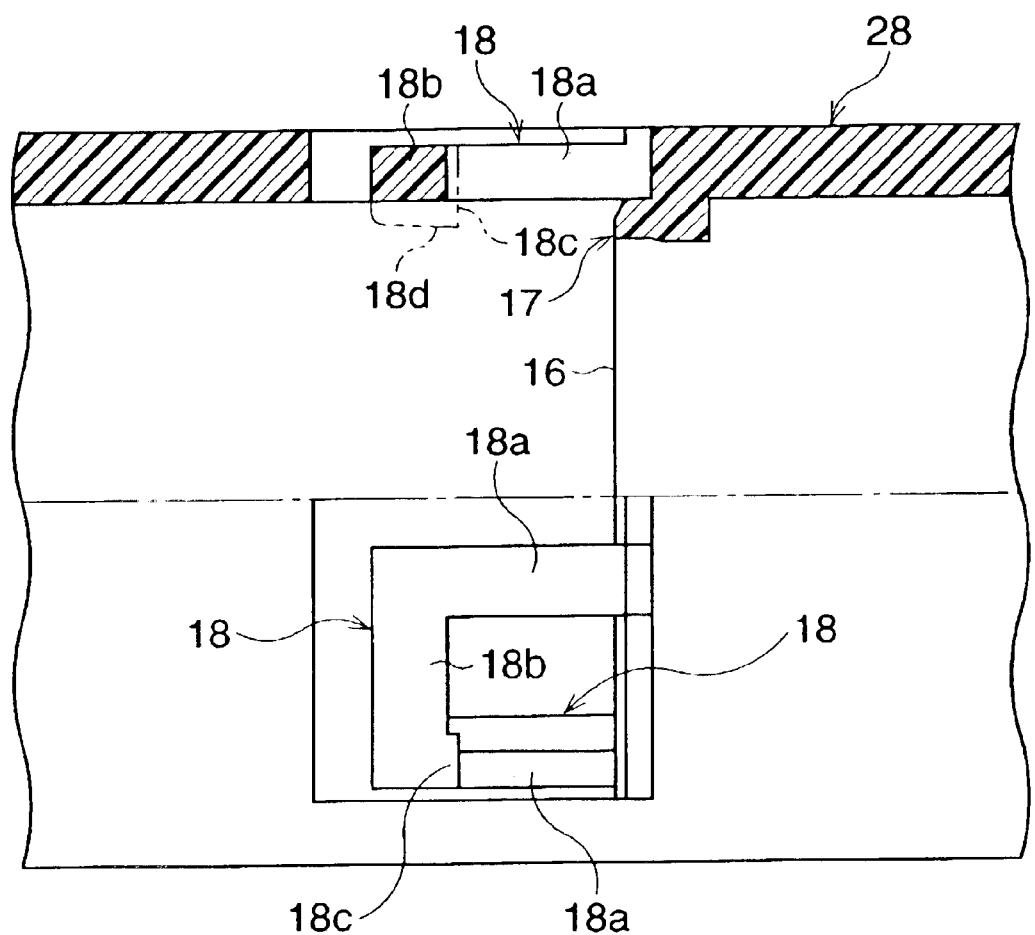
FIG. 6 is a partial longitudinal sectional view corresponding to FIG. 3 showing a second embodiment of a lens-holding frame according to the present invention.

Referring to FIG. 6, a second embodiment of the lens-holding frame according to the present invention is shown. Note that in FIG. 6, the same reference numerals are used for the same components as those in the first embodiment. In the second embodiment, the lens-holding frame is integrally built into the middle part of the lens barrel 28. That is, the lens barrel 28 is integrally formed by a suitable mold from a suitable synthetic resin material, for example, ABS resin material. At this time, a ring-shaped rim 16 is formed on the inner surface of the lens barrel 28. Namely, a ring-shaped abutting end-face 17 is provided by the side plane of the ring-shaped rim 16. Further, lens-holding arms 18 which are designed to cooperate with the ring-shaped abutting end-face 17 are formed inside the circumferential wall of the lens barrel 28. The lens-holding arms 18 themselves are formed in the same way as those of the first embodiment and are used for holding the lens or lenses, forming part of the suitable optical system provided inside the lens barrel 28.

In the second embodiment shown in FIG. 6, when mounting the lens group in the lens-holding frame, first, the lens group is inserted into the lens barrel 28, the circumferential edge is engaged with the tapered surfaces 18c of the lens-holding arm means 18, then the lens is pushed in toward the ring-shaped rim 16 by a suitable tool, whereupon, in the same way as in the first embodiment, the lens is held at a predetermined holding position of the lens-holding frame.

Figure 7:
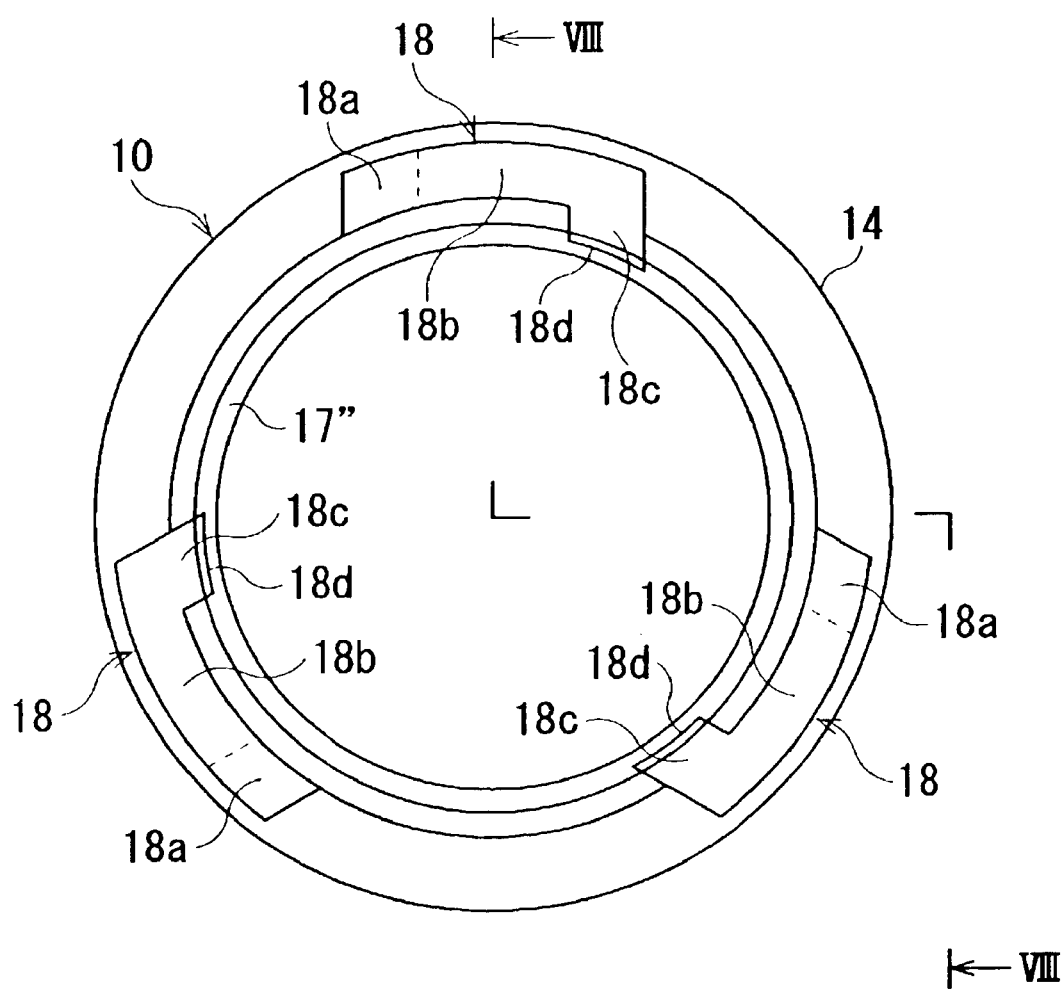
FIG. 7 is a sectional view corresponding to FIG. 2 showing a third embodiment of a lens-holding frame according to the present invention.
Figure 8:
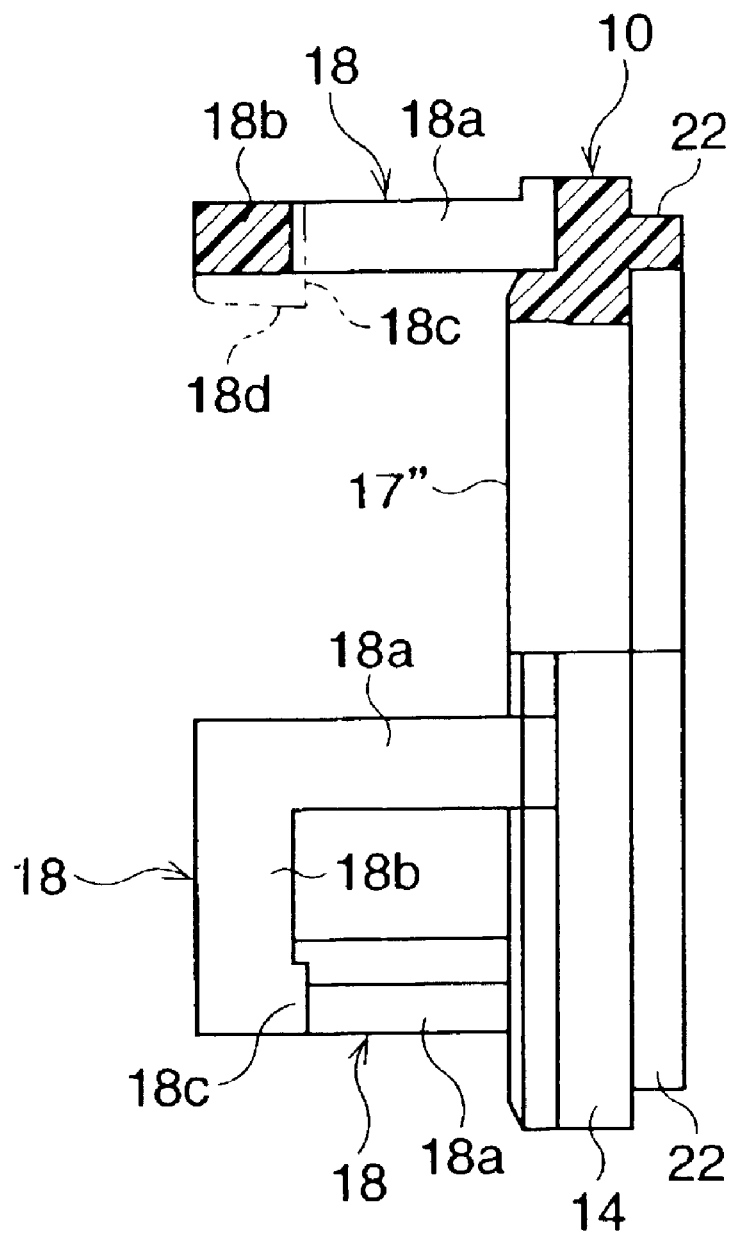
FIG. 8 is a partial longitudinal sectional view along the line VIII—VIII of FIG. 7.

Referring to FIG. 7 and FIG. 8, a third embodiment of the lens-holding frame according to the present invention is shown. Note that, in FIG. 7 and FIG. 8, the same reference numerals are used for the same components as those in the first embodiment. In the first embodiment, the ring-shaped frame body 14 is formed as a sleeve-shaped member, but in the third embodiment, the ring-shaped frame body 14 is formed as a ring-shaped disk member.

The ring-shaped frame body, that is, the ring-shaped disk member 14, is given an outside diameter larger than the diameter of the lens group L. A ring-shaped abutting end-face 17" is formed on one side of the ring-shaped disk member 14 along the circumference thereof. The ring-shaped abutting end-face 17" forms a positioning member for defining the holding position of the lens group L by abutting against the lens. The ring-shaped abutting end-face 17" extends along the inside circumference of a circle substantially equal to the diameter of the lens or lenses of the lens group L.

In the third embodiment, three lens-holding arms 18 extend integrally from one side of the ring-shaped disk member 14, that is, the side where the ring-shaped abutting end-face 17" is formed, parallel to the center axis. Further, they are arranged at equal intervals so as to circumscribe a circle having a diameter substantially the same as the lens group L. Each lens-holding arm 18 itself is configured in the same way in as the case of the first embodiment. In short, the third embodiment is configured corresponding to the first embodiment from which the circumferential wall is removed from the sleeve-shaped member 14. In this third embodiment, the lens group L can be mounted in the lens-holding frame 10 in the same way as with the first embodiment. Note that the modifications and alterations explained for the first embodiment should be understood as being applicable to the the third embodiment as well.

As stated above, in the above embodiments, the total length of each lens-holding arm 18 is made longer to give a suitable elasticity there by bending part of the lens-holding arm 18 to a right angle shape to form the first and second arm sections 18a and 18b. However, it should be understood that the arm can be deformed to another suitable shape to make the total length of the lens-holding arm longer. On the other hand, when the lens-holding arm 18 is given a suitable elasticity without deforming its shape, it is not necessary to go to the trouble of deforming the lens-holding arm means 18. In this case the lens-holding frame 10 may integrally formed from a relatively soft synthetic resin material and each lens-holding arm 18 can be straight.

According to the present invention, the problems in the prior art described in the following can be over come. In the prior art, the lens-holding frame comprises two parts, that is, a lens holding barrel and a lens-retaining ring, and it is necessary to cut threads into these parts. Therefore, the production costs of a conventional lens-holding frame become relatively high. Further, in the conventional lens-holding frame, mounting the lens in the lens-holding frame involves the task of screwing the lens-retaining ring in the lens holding barrel. This screwing task takes a relatively long amount of time and therefore is inferior in terms of lens mounting efficiency.

As is clear from the above description of the present embodiments, the time for the lens mounting task can be greatly shortened by using the lens-holding frame according to the present invention, since the lens can be mounted in the lens-holding frame by just pushing the lens in toward the positioning member making use of the tapered surfaces of the lens-holding arms. Further, since the lens-holding frame according to the present invention is produced as a single piece of an integrally shaped part, the production costs can also be kept low.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-018456 (filed on Jan. 28, 2002) which is expressly incorporated herein, by reference, in its entirety.

What is claimed is:

1. A lens-holding frame for holding a lens at a predetermined position, said lens-holding frame comprises:
   a frame body;
   at least two lens-holding arms that are elastically deformable and supported in a cantilever manner by said frame body so that said lens-holding arms circumscribe said lens; and
   a positioning member that is provided along the inside circumference of said frame body so that said positioning member abuts against a circumferential edge of said lens for defining the holding position of said lens;
   wherein each of said lens-holding arms comprises a projection which projects out and penetrates to the inside of said frame body, and a space between said positioning member and said projection is given dimensions and a shape that can receive the circumferential edge of said lens, and further said projection is formed with a tapered surface, so that said circumferential edge of said lens can ride over said projection as a result of said lens-holding arms being elastically pushed open when said circumferential edge of said lens is engaged with said tapered surface and said lens is pushed in toward said positioning member.

2. A lens-holding frame according to claim 1, wherein said frame body comprises a connection part that is used for connecting said frame body to a lens barrel.

3. A lens-holding frame according to claim 1, wherein said frame body is integrally formed as part of a lens barrel.

4. A lens-holding frame according to claim 1, wherein said lens describes a circular profile, and said lens-holding arms are made to circumscribe a circle having substantially the same diameter as said lens so that said projections of said lens-holding arms are made to penetrate to the inside of said circle.

5. A lens-holding frame according to claim 4, wherein each of said lens-holding arms comprises:
   a first arm section that extends in a direction parallel with a center axis of said frame body; and
   a second arm section that integrally extends from said first arm section along an arc of said circle;
   wherein said projection is integrally formed at a front end of said second arm section.

6. A lens-holding frame according to claim 4, wherein said frame body is configured as a sleeve-shaped member that comprises a synthetic resin material, in which an inside diameter of said sleeve-shaped member is substantially equal to the diameter of said lens, and said lens-holding arms are integrally formed in the circumferential wall of said sleeve-shaped member.

7. A lens-holding frame according to claim 6, wherein said positioning member comprises a ring-shaped abutting end-face that is formed on a ring-shaped rim which integrally extends out from the inner surface of said sleeve-shaped member, along the circumference of said inner surface.

8. A lens-holding frame according to claim 6, wherein said positioning member comprises arc-shaped abutting end-faces that are formed on each of arc-shaped rims which integrally extend out from the inner surface of said sleeve-shaped member along the circumference of said inner surface at equal intervals.

9. A lens-holding frame according to claim 4, wherein said frame body is configured as a ring-shaped disk member that comprises a synthetic resin material, in which an outside diameter of said ring-shaped disk member is larger than the diameter of said lens, and said lens-holding arms integrally extend out from one side of said ring-shaped disk member in a direction parallel with the center axis of said ring-shaped disk member.

10. A lens-holding frame according to claim 9, wherein said positioning member comprises a ring-shaped abutting end-face that is formed on said one side of said ring-shaped disk member along the circumference of said ring-shaped disk member.

11. A lens-holding frame according to claim 9, wherein said positioning member comprises at least two arc-shaped abutting end-faces that are formed at equal intervals on said one side of said ring-shaped disk member along the circumference of said ring-shaped disk member.

* * * * *